March 10, 1936. A. V. NEWMAN 2,033,781
SHAKER CONTROL DEVICE FOR CONFECTION COATING MACHINERY
Filed May 18, 1933
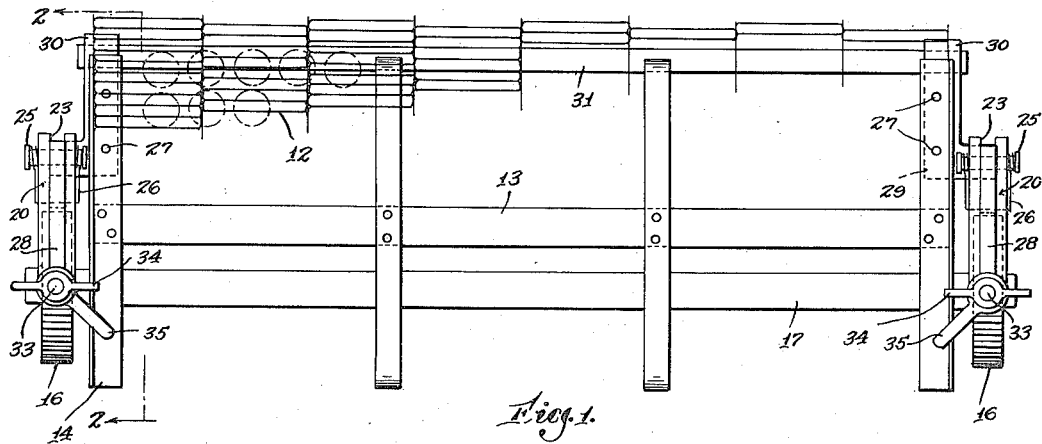
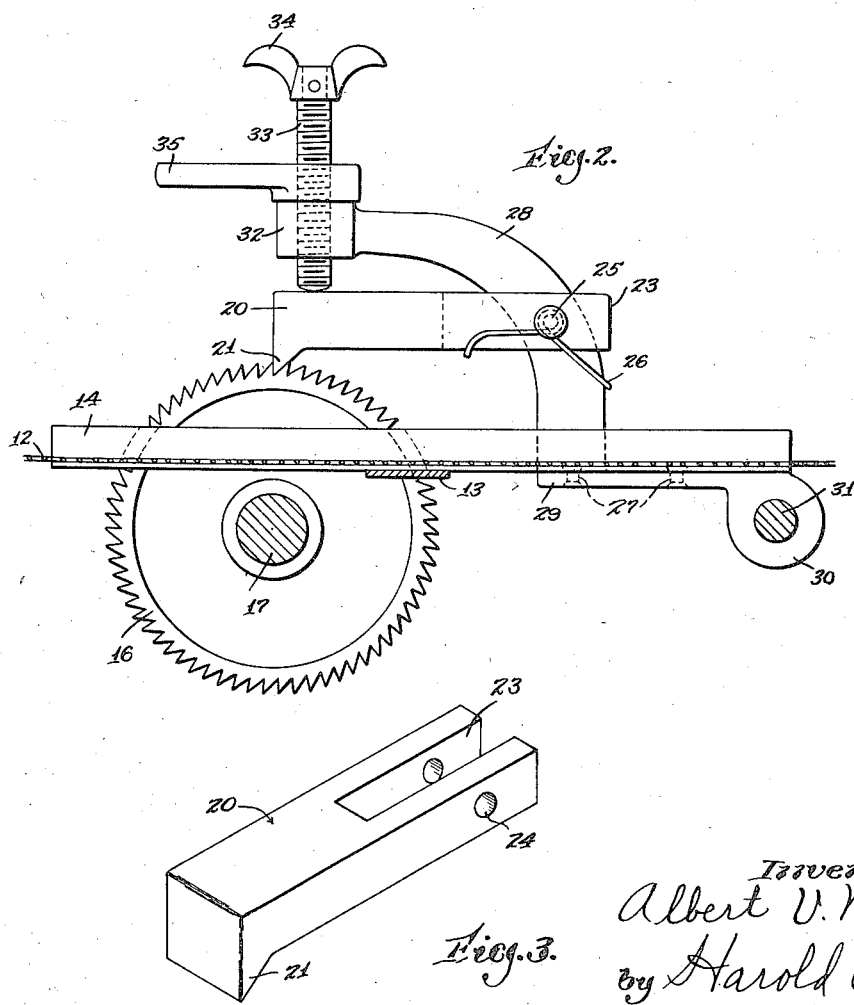
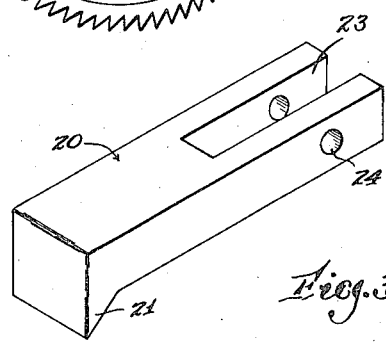
Inventor
Albert V. Newman
by Harold E. Cole
Attorney Patented Mar. 10, 1936

2,033,781

UNITED STATES PATENT OFFICE 2,033,781

SHAKER CONTROL DEVICE FOR CONFECTION COATING MACHINERY

Albert V. Newman, Cambridge, Mass., assignor to Edgar P. Lewis & Sons, Inc., Malden, Mass., a corporation of Massachusetts Application May 18, 1933, Serial No. 671,691

7 Claims. (Cl. 91—3)

This invention relates to a device for controlling the shaking of the conveyor of a confection coating machine.

In coating candy or other confections the confections are placed on a conveyor consisting of a perforated, endless apron which runs over suitable rolls, and liquid chocolate or other coating material is applied to them as they are carried along the conveyor. Inasmuch as the coating is unevenly applied it is necessary to distribute it evenly over the confection and remove excess material by applying a shaking movement to the conveyor, the degree of shaking all depending upon the size of the confection, condition of the coating, et cetera.

Heretofore it has been impossible to control or adjust the shaking movement to the fine degrees desired, because the adjustment was made by definite steps with no intermediate adjustment between the steps possible. Also if great care were not used to keep the adjusting parts of the shaking device tight, the pawl tooth would be forced out of operative position and no shaking movement would take place.

Accordingly one of my objects is to provide a device capable of the finest adjustment to control the shaking movement of the conveyor or moving apron on which the coated confections are being carried. Another object is to so make my device that it will hold the desired shaking position even should the adjusting parts be left loose or work loose. Still another object is to make my device of few and simple parts which can readily be attached to and adjusted while on the confection coating machines already in use.

The foregoing and other objects which will appear as the nature of the invention is better understood, may be accomplished by a construction, combination and operative arrangement of parts such as is disclosed by the drawing. The nature of the invention is such as to render it susceptible to various changes and modifications, and, therefore, I am not to be limited to the construction disclosed by the drawing; but am entitled to all such changes therefrom as fall within the scope of my claims.

In the drawing:

Figure 1 is a plan view of the conveyor apron, shown partly broken away, of a confection coating machine, illustrating the mechanism for shaking the conveyor and my control device.

Figure 2 is an enlarged cross section taken on the line 2—2 of Figure 1 illustrating my device in detail.

Figure 3 is a perspective view of the pawl part of my device.

As illustrated the confection coating machine has an endless conveyor apron 12, preferably made of wire, on which the confections to be coated, shown in dotted lines in Figure 1 of the drawing, are carried, which moves over a shaker bar 13 having an angle iron guide 14 at each end to help guide said apron 12. On each side of said apron 12 is a ratchet wheel 16 adapted to be rotated, both of which ratchet wheels 16 are connected by a shaft 17.

To obtain the rocking movement of said apron 12, a pawl 20 is provided, the tooth 21 of which may be forced downwardly between the teeth of the ratchet wheel 16 to any degree desired, as later described. The farther down said tooth extends the greater the shaking movement attained. It is the fine control of this tooth 21, by forcing it into any desired position between the teeth of said ratchet wheel 16, and the operative maintenance of that position, which my device accomplishes. Said pawl 20 is forked at one end as at 23, in the sides of which fork are holes 24 through which a pin 25 extends for a purpose later described. A wire spring 26 is fastened around one end of said pin 25 passing under said pawl 20 and around a shaker casting or arm 28 later described, and being fastened to the opposite end of said pin 25. Pivotally fastened to the forked portion 23 of said pawl 20 by means of said pin 25 is a shaker casting or arm 28 riveted as at 27 to said shaker bar angle iron 14, and extending below it and below said conveyor apron 12. Said shaker arm has an offset 29, at the end of which is formed a bearing 30, in which one end of a rock shaft 31 is loosely mounted which rock shaft extends across said conveyor apron 12, the other end being likewise mounted in a similar bearing on the other side. I preferably make this shaker arm 28 in one piece, although it could be made of two or more parts, and be effective.

Said shaker arm 28 has an interiorly threaded boss 32 at its upper end through which a control screw 33 passes, the lower end of which screw being adapted to be moved into contact with said pawl 20 and force the pawl tooth 21 downwardly, the position of said screw determining how far said pawl tooth shall extend between the teeth of the ratchet wheel 16. The tension of said wire spring 26 tends to force said pawl 20 upwardly, while said screw 33 when turned downwardly, overcomes the tension of said wire spring 26, to force the pawl lower. A wing nut 34 on the end of said screw makes it convenient to turn it, and after the desired position of the tooth 21 has been attained, the lock nut 35, preferably having a handle as shown, is screwed down, to thereby lock my device in position. Even though this lock nut were not tightened the position of the tooth 21 would be maintained for a long period, and probably permanently, as there is very little tendency for the screw 33 to turn while the machine is in operation.

To operate my device, the lock nut 35 is loosened, and the wing nut 34 is turned to lower the control screw 33 or raise it, as desired, and when said tooth 21 has been moved to the exact position desired, the lock nut 35 is tightened, and the machine is ready for operation. Inasmuch as the tooth 21 cannot turn because the pawl 20 is fastened to the shaker arm 28, it is always correctly pointed with respect to the ratchet wheel teeth, and a mere movement of the screw 33 is all that is necessary to vary the shaking movement of the conveyor apron.

As the gears 16 rotate the pawl tooth 21 is successively forced from its position in the space between two of the ratchet wheel teeth to the next space, and so on, causing a jarring or shaking movement which is transmitted to the shaker arm 28 and shaker bar 13 and other parts, to thereby shake the conveyor 12 on which the confections are carried, which distributes the liquid chocolate evenly over the confection, and causes the excess to run off onto the conveyor 12.

What I claim is:

1. A shaker control device comprising a pawl embodying a tooth, movable means adapted to be moved away from or into contact with said pawl to thereby force it downwardly, means connected with said pawl to permanently hold said tooth in a predetermined position, and a spring connected to said pawl and the latter-mentioned means adapted to force said pawl to its normal position when the pressure of said movable means is removed.

2. A shaker control device comprising a pawl embodying a tooth, movable means adapted to be moved away from or into contact with said pawl to thereby force it downwardly, a member connected with said means and said pawl, and means connected to said member and said pawl to return said pawl to normal position when the pressure of said movable means is removed.

3. A shaker control device comprising a pawl embodying a tooth, movable screw-threaded means adapted to move said pawl and to be moved away from said pawl, a shaker arm having a screw threaded opening through which said screw extends, said arm extending to said pawl, means to connect said pawl and said arm, and spring means to hold said pawl and said arm in such relation to each other that when the pressure of said screw on said pawl is removed, said spring means forces said pawl to return to normal position.

4. A shaker control device comprising a pawl embodying a tooth pointing downwardly and having a forked portion, a screw adapted to contact with said pawl and force said pawl downwardly when actuated, a shaker arm having a threaded portion with which said screw cooperates, said shaker arm passing into said forked portion, a pin passing through said forked portion and said shaker arm to hold said portion and arm together, and a spring fastened to said pin at one end and extending around a portion of said pawl and said arm and fastened to the opposite end of said pin, said spring holding said pawl and said arm in such relation to each other as to return said pawl to normal position when pressure against it is removed.

5. A shaker control device comprising a pawl embodying a tooth at one end portion and being forked at the other end portion, a screw adapted to be moved into contact with said pawl and force it downwardly and to be moved away from said pawl, a shaker arm having screw threads at one end portion with which said screw cooperates, said shaker arm extending into said forked portion of said pawl, means to fasten said forked portion and said shaker arm together, and a spring outside of said forked portion and said arm and fastened to said means to hold said pawl and said arm in such relation to each other as to return said pawl to normal position when pressure against it is removed.

6. In a confection coating machine having a confection conveyor and mechanism to shake said conveyor, a shaker control device for said mechanism comprising a pawl embodying a tooth, said pawl having an opening therein, a member adapted to be moved away from or into contact with said pawl to thereby force it downwardly, an arm through which said member extends, said arm passing through said opening, and means to hold said arm and pawl together and to cause said pawl to return to normal position when the pressure of said member is removed from said pawl.

7. A confection coating machine comprising a confection conveyor, shaker mechanism operatively connected thereto, a shaker arm connected to said mechanism, a ratchet wheel rotatably mounted adjacent said mechanism, a pawl embodying a tooth extending into the space between two of the teeth of said ratchet wheel, means to movably hold said pawl to said shaker arm, a control screw connected to said shaker arm and adapted to be actuated against said pawl to thereby force said pawl downwardly.

ALBERT V. NEWMAN.